(12) United States Patent
Marks et al.

(10) Patent No.: US 7,743,269 B2
(45) Date of Patent: Jun. 22, 2010

(54) SYSTEM AND METHOD OF MANAGING POWER CONSUMPTION OF COMMUNICATION INTERFACES AND ATTACHED DEVICES

(75) Inventors: Kevin Marks, Round Rock, TX (US); Gary Kotzur, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 638 days.

(21) Appl. No.: 11/678,677

(22) Filed: Feb. 26, 2007

(65) Prior Publication Data

US 2008/0209246 A1     Aug. 28, 2008

(51) Int. Cl.
*G06F 1/00* (2006.01)
(52) U.S. Cl. ...................... 713/323; 713/300
(58) Field of Classification Search .......... 713/320, 713/323, 300
See application file for complete search history.

(56) References Cited

U.S. PATENT DOCUMENTS

| | | | | |
|---|---|---|---|---|
| 3,811,014 A | * | 5/1974 | Seitz | 370/472 |
| 3,840,708 A | * | 10/1974 | Clark | 370/241 |
| 5,539,728 A | * | 7/1996 | Gaiani et al. | 370/342 |
| 6,243,366 B1 | * | 6/2001 | Bradley et al. | 370/318 |
| 6,317,839 B1 | * | 11/2001 | Wells | 713/320 |
| 6,707,820 B1 | * | 3/2004 | Arndt et al. | 370/395.2 |
| 7,200,186 B2 | * | 4/2007 | Schoenborn | 375/316 |
| 7,480,808 B2 | * | 1/2009 | Caruk et al. | 713/300 |
| 2008/0126158 A1 | * | 5/2008 | Notea | 705/7 |

* cited by examiner

*Primary Examiner*—Nitin C Patel
(74) *Attorney, Agent, or Firm*—Larson Newman & Abel, LLP (57) ABSTRACT

A system and method of managing power consumption of communication interfaces and attached devices is disclosed. In one form of the disclosure, a communication module can include a communication interface operable to receive link utilization information of a plurality of communication channels of the communication interface. The communication module can also include a processor operable to determine a percent utilization of the plurality of communication channels using the link utilization information. The processor can also be operable to initiate issuing a power management request of at least one of the plurality of communication channels in response to comparing the percentage of link utilization to a threshold level.

19 Claims, 7 Drawing Sheets

"IDENTIFY" address frame format

| Byte/Bit | 7 | 6 | 5 | 4 | 3 | 2 | 1 | 0 |
|---|---|---|---|---|---|---|---|---|
| 0 | Restricted (for OPEN address frame) | DEVICE TYPE | | | ADDRESS FRAME TYPE (0h) | | | |
| 1 | RESERVED | | | | REASON | | | |
| 2 | RESERVED | | | | SSP INITIATOR PORT | STP INITIATOR PORT | SMP INITIATOR PORT | Restricted (for OPEN address frame) |
| 3 | RESERVED | | | | SSP TARGET PORT | STP TARGET PORT | SMP TARGET PORT | Restricted (for OPEN address frame) |
| 4 – 11 | DEVICE NAME | | | | | | | |
| 12 – 19 | SAS ADDRESS | | | | | | | |
| 20 | PHY IDENTIFIER | | | | | | | |
| 21 | RESERVED | | | | WIDE LINK POWER MANAGEMENT CAPABLE | INSIDE ZP SDS PERSISTENT | REQUESTED INSIDE ZPSDS | BREAK_REPLY CAPABLE |
| 22 – 27 | RESERVED | | | | | | | |
| 28 – 31 | CRC | | | | | | | |

*FIG. 3*

"PHY CONTROL" request format

| Byte/Bit | 7 | 6 | 5 | 4 | 3 | 2 | 1 | 0 |
|---|---|---|---|---|---|---|---|---|
| 0 | SMP FRAME TYPE (40h) | | | | | | | |
| 1 | FUNCTION (91h) | | | | | | | |
| 2 | RESERVED | | | | | | | |
| 3 | REQUEST LENGTH (09h) | | | | | | | |
| 4 | EXPECTED EXPANDER CHANGE COUNT | | | | | | | |
| 5 | | | | | | | | |
| 6 | RESERVED | | | | | | | |
| 8 | | | | | | | | |
| 9 | PHY IDENTIFIER | | | | | | | |
| 10 | PHY OPERATION | | | | | | | |
| 11 | RESERVED | | | | | | ENABLE WIDE LINK POWER MANAGEMENT | UPDATE PARTIAL PATHWAY TIMEOUT VALUE |
| 12 | RESERVED | | | | | | | |
| 31 | | | | | | | | |
| 32 | PROGRAMMED MINIMUM PHYSICAL LINK RATE | | | | RESERVED | | | |
| 33 | PROGRAMMED MINIMUM PHYSICAL LINK RATE | | | | RESERVED | | | |
| 34 | RESERVED | | | | | | | |
| 35 | | | | | | | | |
| 36 | RESERVED | | | | PARTIAL PATHWAY TIMEOUT VALUE | | | |
| 37 | RESERVED | | | | | | | |
| 39 | | | | | | | | |
| 40 | CRC | | | | | | | |
| 43 | | | | | | | | |

SYSTEM AND METHOD OF MANAGING POWER CONSUMPTION OF COMMUNICATION INTERFACES AND ATTACHED DEVICES

FIELD OF THE DISCLOSURE

This disclosure relates generally to information handling systems, and more particularly to a system and method of managing power consumption of communication interfaces and attached devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various information handling systems can be realized as servers that can be mounted within server racks. Servers can allow for accessing and serving information, applications, and various types of data to multiple clients via an Intranet, the Internet, or combinations thereof. The complexity and density of servers and associated components for some enterprise data centers impacts environmental and operating conditions of servers within data centers. Current data centers can be constrained by the power and cooling required to operate the sheer number of devices (servers, storage networking hardware, etc.) necessary to meet the demands of a dynamic business.

The constraints on power utilization, and the cooling challenges that follow, can drive customers to underutilize data center resources in an effort to fulfill business computing needs. As such, there have been numerous efforts to reduce power consumption within servers, but the large growth in data and available storage capacities have developed a need to manage power within storage systems and associated devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of operating a communication module is disclosed. The method can include obtaining a first link utilization of a first communication channel coupled to a first communication interface and enabling power management of the first communication interface. The method can also include determining a first utilization total of the first communication interface, and modifying operation of the first communication channel using the utilization total.

According to another aspect of the disclosure, a communication module can include a communication interface operable to receive link utilization information of a plurality of communication channels of the communication interface. The communication module can also include a processor operable to determine a percent utilization of the plurality of communication channels using the link utilization information. The processor can also be operable to initiate issuing a power management request of at least one of the plurality of communication channels in response to comparing the percentage of link utilization to a threshold level.

According to a further aspect of the disclosure, an information handling system can include a first communication interface operably coupled to a processor operable to initiate power management of the communication interface. The information handling system can also include a plurality of communication interfaces coupled to the first communication interface. The plurality of communication interfaces can be a power management request communicated by the first communication interface. The information handling system can also include a threshold monitor operable to initiate altering use of at least one of a plurality of communication channels in response to determining a percent utilization relative to a threshold level of at least one of the plurality of communication interfaces.

Figure 1:
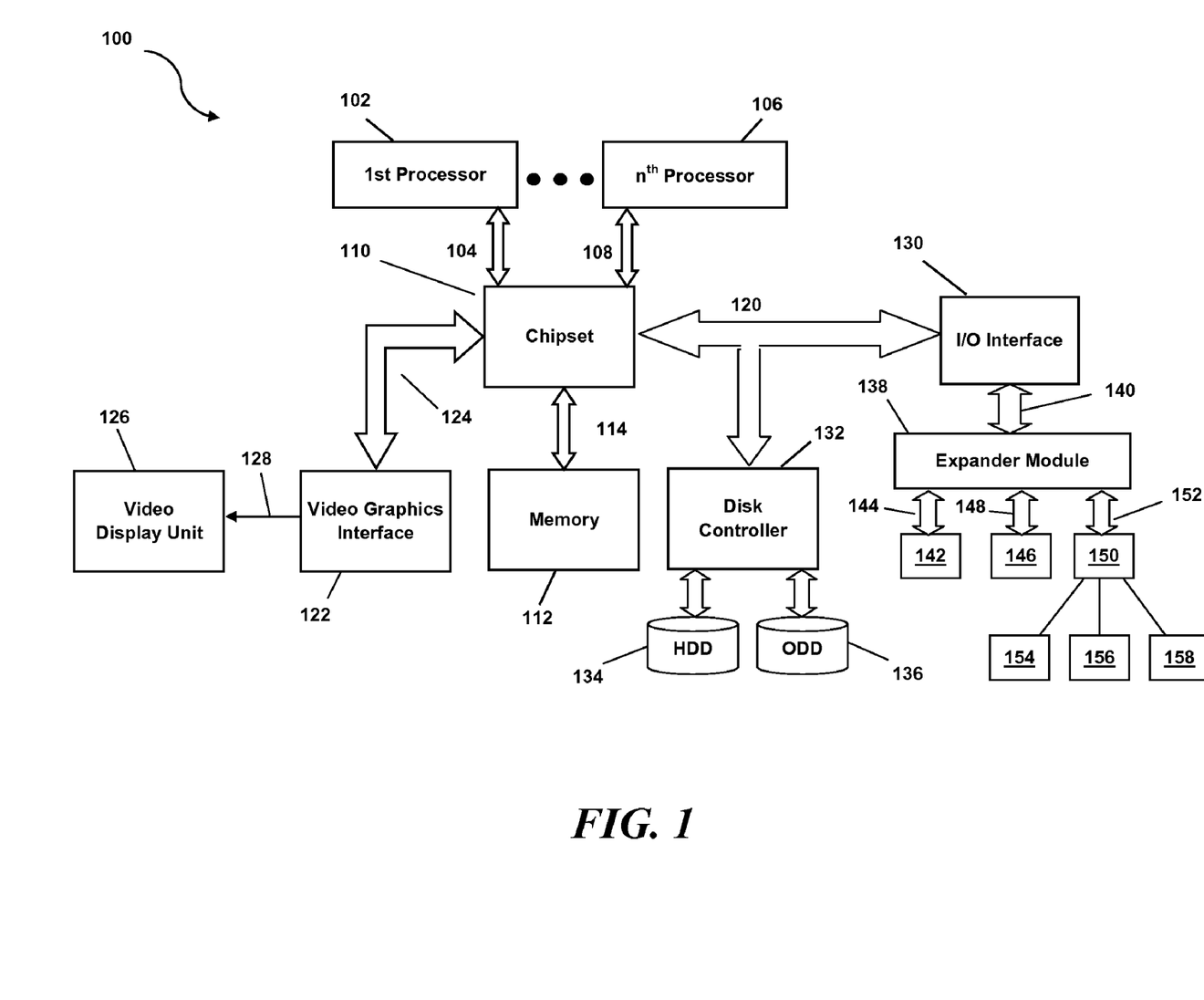
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to provide access to the first physical processor 102 using first bus 104 and the $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can include an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can provide at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to provide content to display within a video display unit 126. Other graphics interfaces may also be used. The video graphics interface 122 can provide a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 can also be coupled to one or more communication modules, such as an expander module 138. An expander module 138 can be used to provide systems, servers, server blades or other information handling systems increased bandwidth to access to resources such as storage devices or other information sources. In one form, the expander module 138 can include a SAS enabled communication module that includes one or more communication interfaces that can be coupled to allow for point-to-point communication with storage devices and other information sources. In one form, a wide communication port 140 can be formed between the expander module 138 and the I/O interface 130 using multiple link interfaces or PHYs. A PHY is a module that can include hardware and firmware used to provide communication channels and in one form, includes a receiver and transmitter circuit operable to be used to establish high-speed serial communication. Multiple PHYs can be provided within the wide communication port 140 to establish communication channels for communicating information in a communication interface. For example, a SAS wide link includes a plurality of links between wide ports. Additionally, a wide port can include endpoints including a plurality of PHYs In one embodiment, the expander module 138 can be used to increase bandwidth and aggregate information communicated to the information handling system 100. For example, the expander module 138 can include a first wide link communication port 144 that includes multiple communication channels that can be established to satisfy bandwidth requirements when communicating with a first device 142. The expander module 138 can also include a second wide link communication port 148 operable to communicate with a second device 146. Additionally, the expander module 138 can also be coupled to a second expander module 150 using a third wide link communication port 152. Additional communication channels and wide link ports can be provided as desired.

According to one aspect, the second expander module 150 can be used to access multiple additional devices and in one form can be used to access additional resources 154, 156, 158. For example, additional resources 154, 156, 158, or any combination thereof, can include a redundant array of independent disks (RAIDs), just a bunch of disks (JBODs), small computer system interface (SCSI) enabled drives, serial attached SCSI (SAS) enabled drives, serial attached ATA (SATA) enabled drives, or various other resources that can be accessed using the second expander module 150.

During operation, the expander module 138 can be used to monitor use and enable and disable communication channels using threshold levels, utilization ratios, and bandwidth requirements. For example, the expander module 138 can manage communication links within first wide link communication port 144 by enabling and disabling communication links or PHYs used to establish communication channels. In one form, the expander module 138 can determine utilization levels for each PHY and alter use of one or more of the communication channels in response to a utilization level relative to a threshold value. For example, during low-level access periods, the expander module 138 can disable use of one or more PHY and communication channel within a wide port. As such, a reduction in power consumption of the expander module 138 and associated hardware can be realized during low access periods. Additionally, during increased bandwidth periods, the expander module 138 can enable one or more communication link or PHY to establish communication channels in response to a threshold level being exceeded. As such, the expander module 138 can increase and decrease the number of active PHYs or communication links to provide communication channels as desired.

In one form, the information handling system 100 can be operable to receive a policy that may be issued from a management application to initiate use of power management within the expander module 138. For example, the information handling system 100 can include multiple servers that can be used to access information. A policy can be introduced to the information handling system 100, and possibly to other information handling systems, to manage use of power management within an expander module 138. As such, a management application need only publish a policy that can dictate use of power management capabilities within expander modules to enable and disable power management.

Figure 2:
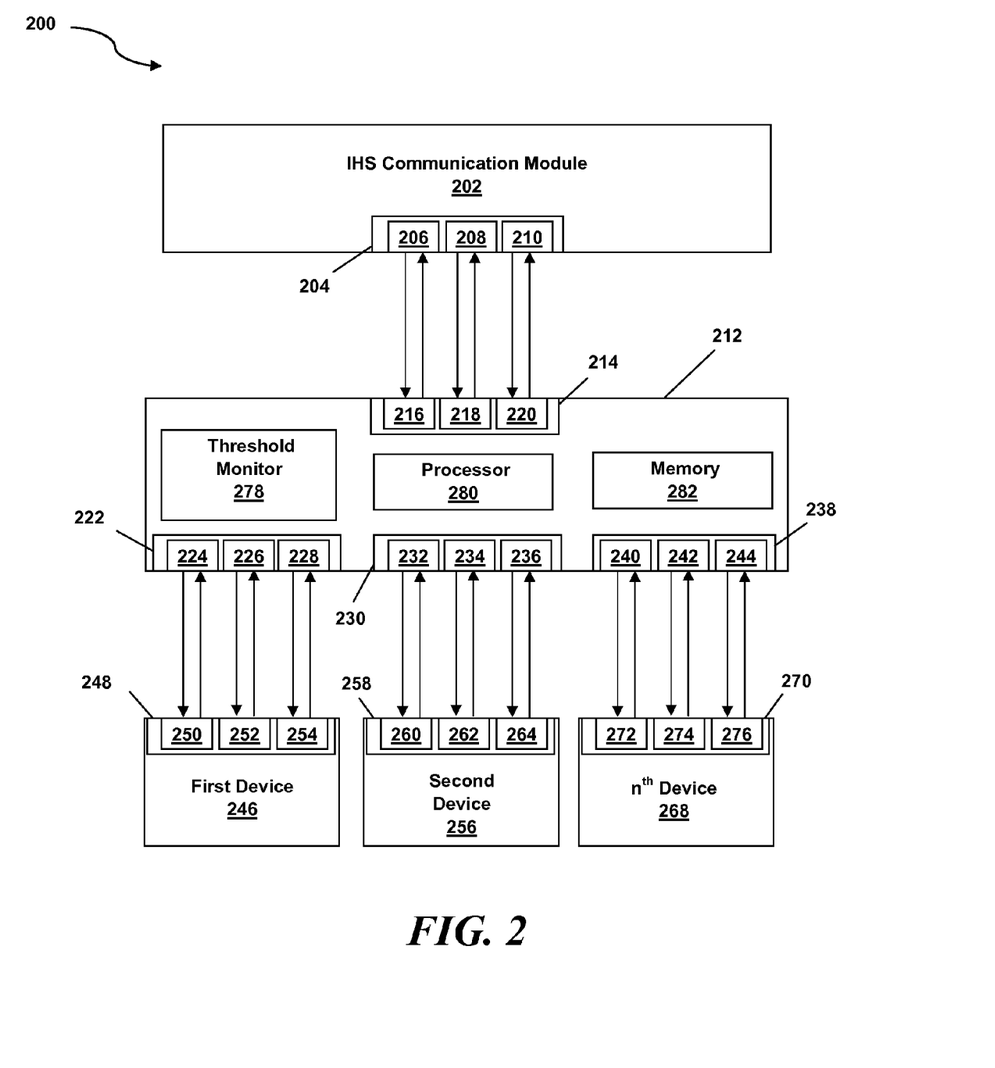
FIG. 2 illustrates a functional block diagram of a dynamic wide link power management system according to one aspect of the disclosure.

FIG. 2 illustrates a functional block diagram of a dynamic wide link power management system, illustrated generally at 200, operable to be used according to one aspect of the disclosure. The dynamic wide link power management system 200 can include an information handling system (IHS) communication module 202, or other communication module, that includes a communication interface 204 operable to be coupled to an expander module 212. According to one aspect, the IHS communication module 202 can be coupled directly to a portion of an information handling system, and in other embodiments, can be provided as a separate component.

In one form, the communication interface 204 can include multiple link interfaces such as a first link interface 206, a second link interface 208, up to an $n^{th}$ link interface 210 as desired. Each link interface 206, 208, 210 can be coupled to a communication medium, such as conductors, fibre, etc. that can include associated hardware for transmitting and receiving signals using a signaling protocol such as SAS, Firewire, Fibre Channel, and the like. In one form, each link interface can include a SAS enabled link interface having a PHY or other type of link interface operable to send and receive signals using a SAS protocol.

According to one aspect, dynamic link power management system 200 also includes an expander module 212 having a first communication interface 214 operable to be coupled to the communication interface 204. The expander module 212 can also include a second communication interface 222 including a first link interface 224, a second link interface 226, and an $n^{th}$ link interface 228. The expander module 212 can also include a third communication interface 230 including a first link interface 232, a second link interface 234, and an $n^{th}$ link interface 236. The expander module 212 can further include a fourth communication interface 238 including a first link interface 240, a second link interface 242, and an $n^{th}$ link interface 244. It should be understood that the expander module 212 can also be coupled to additional expander modules (not shown) as desired. Also, the expander module 212 can be configured to expand communication or bandwidth and in some forms can be provided as a 24×, 36×, 48×, etc. expander module.

According to one aspect, the expander module 212 can also be coupled to one or more devices such as a first device 246, a second device 256, an $n^{th}$ device 268, or combinations thereof. In one embodiment, the devices 246, 256, 268 can be configured to communicate using a SAS-enabled wide link communication interface. For example, the first device 246 can include a communication interface 248 including a first link interface 250, a second link interface 252, and an $n^{th}$ link interface 254. The second device 256 can include a communication interface 258 including a first link interface 250, a second link interface 252, and an $n^{th}$ link interface 254. The third device 256 can include a communication interface 268 including a first link interface 272, a second link interface 274, and an $n^{th}$ link interface 276. Each link interface can include separate PHYs and in one form, each communication interface can be used as a wide link communication interface having multiple channels established using multiple link interfaces or PHYs. Additionally, although illustrated as separate communication interfaces, it should be understood that one or more of the communication interfaces 222, 230, 238, 214, or any combination thereof, can be combined as desired.

In one embodiment, the first communication interface 214 of the expander module 212 can be coupled to an information handling system having a blade chassis that houses multiple blade servers. The expander module 212 can be SAS-enabled and operable to communicate with one or more devices 246, 256, 268 operable as SAS-enabled storage devices. Although illustrated as using a single expander module, it should be understood that additional expander modules can be used within the dynamic link power management system 200 as desired. For example, the expander module 212 can be coupled to one or more expander modules that can be used to access one or more storage devices to communicate information to one or more host servers.

According to one embodiment, the expander module 212 also includes a threshold monitor 278, a processor 280, and memory 282. In one form, the threshold monitor 278 can be provided as a part of the expander module 212, or in other embodiments, can be provided as a part of another system, module, etc. The threshold monitor 278 can also be provided as software or other logic stored within the memory 282 and operable to be executed by the processor 280 during use of the expander module 212. In another form, the threshold monitor 278 can include logic such as software or firmware that can be used in combination with other processors, modules, or encoded logic (not illustrated) to control and operate the expander module 212.

Figure 5:
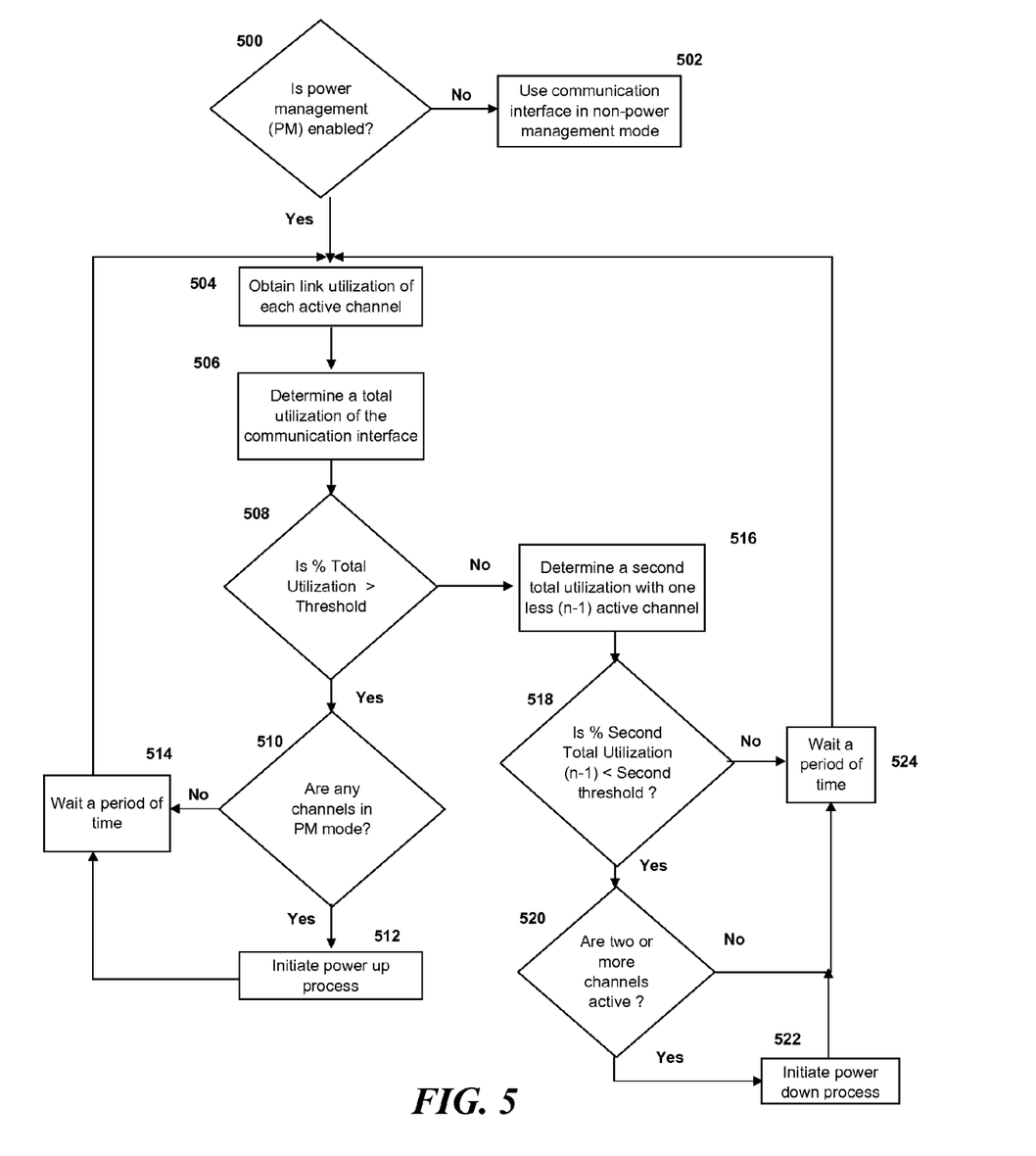
FIG. 5 illustrates a flow diagram of a method of monitoring link use within a communication module according to one aspect of the disclosure.
Figure 6:
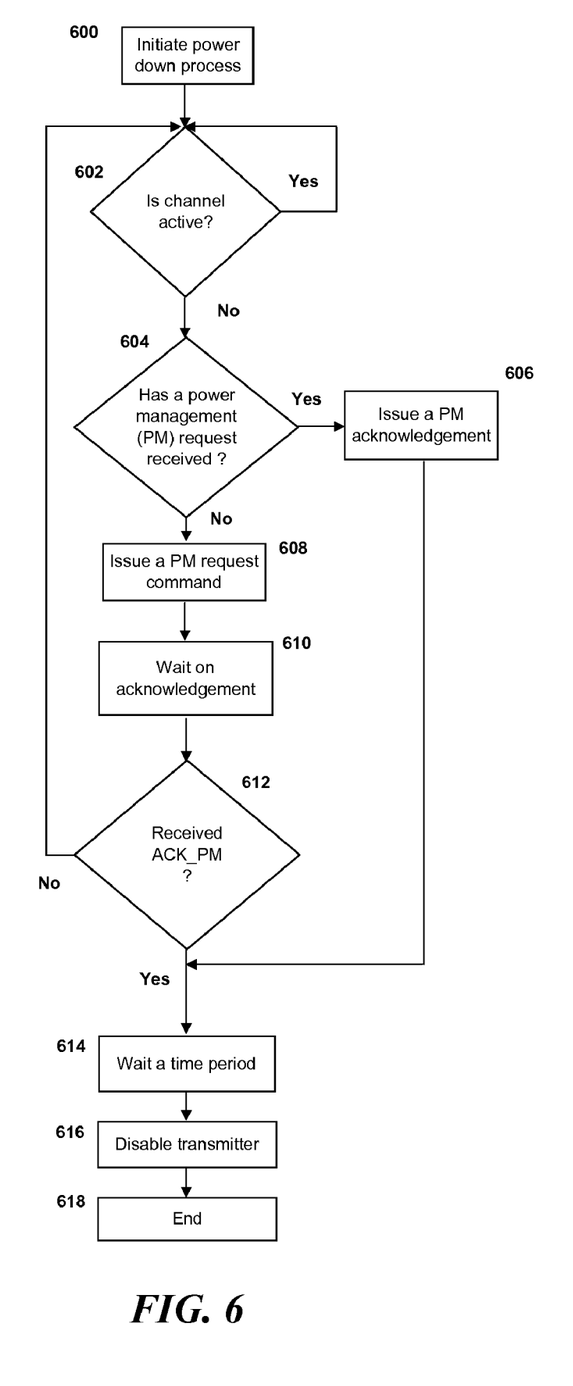
FIG. 6 illustrates a flow diagram of a method of disabling a communication channel using a threshold level according to another aspect of the disclosure.
Figure 7:
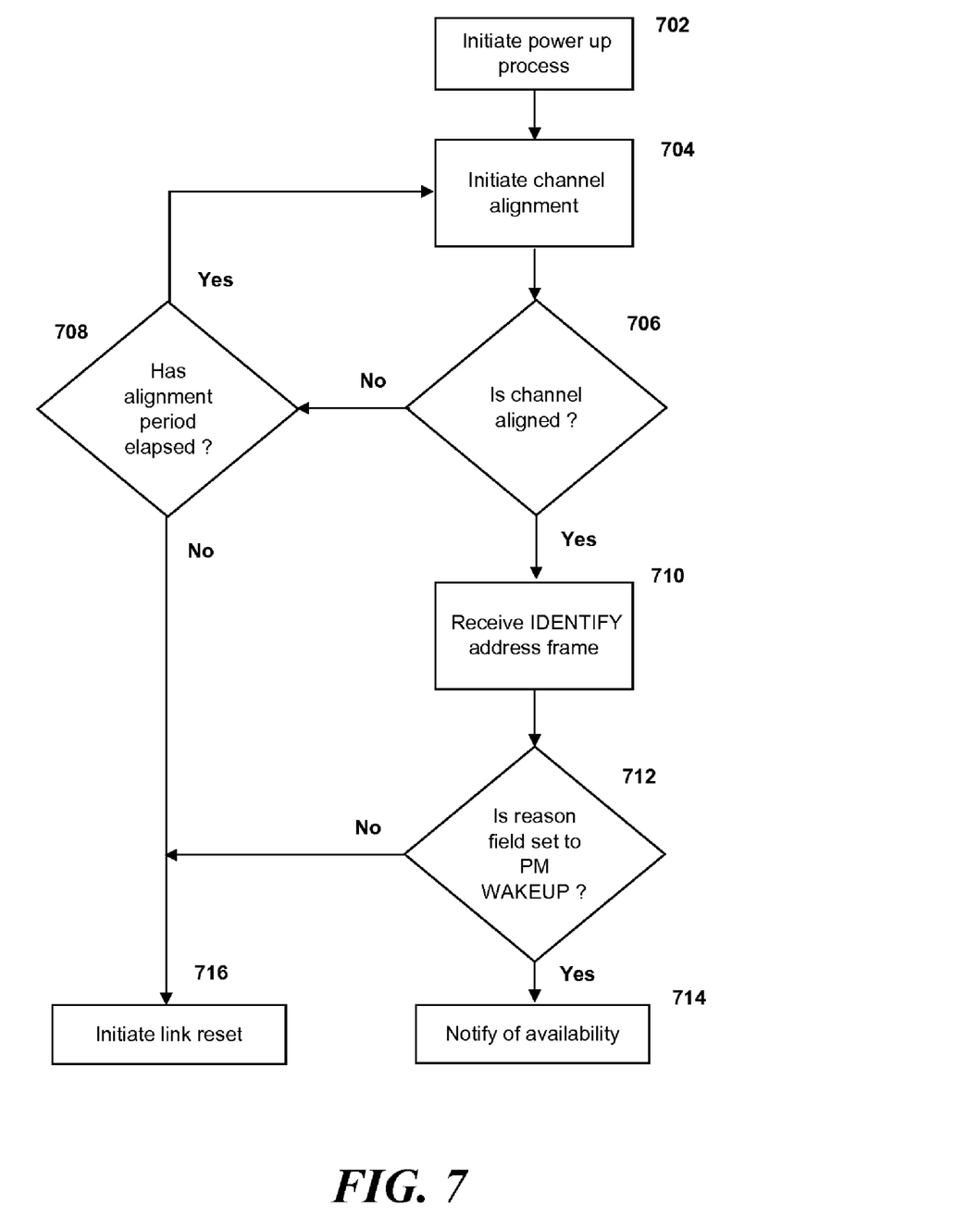
FIG. 7 illustrates a flow diagram of a method of enabling a communication channel according to another aspect of the disclosure.

During use, the expander module 212 can be used to access resources using a SAS protocol while dynamically allocating bandwidth by monitoring link utilization using the threshold monitor 278. The threshold monitor 278 can be operable to monitor threshold levels and initiate activating and deactivating communication interfaces, specific link interfaces/communication channels, PHYs, or any combination thereof as desired based on threshold levels, required bandwidth, utilization levels. FIGS. 5-7 below describe methods that can be employed by the expander module 212 and used in association with the threshold monitor 278.

For example, during a power down sequence, the threshold monitor 278 can detect low bandwidth use of the first communication interface 222 by requesting link utilization information from each link interface 224, 226, 228. A sum of the link utilizations can be compared to a threshold value and if, the threshold value is not exceeded, one or more of the link interfaces 224, 226, 228 can be powered down. For example, each link interface 224, 226, 228 can include a transmitter circuit that can be powered down. As such, the first communication interface 222 can satisfy bandwidth requirements while reducing the overall power consumption of the expander module 212.

Figure 3:
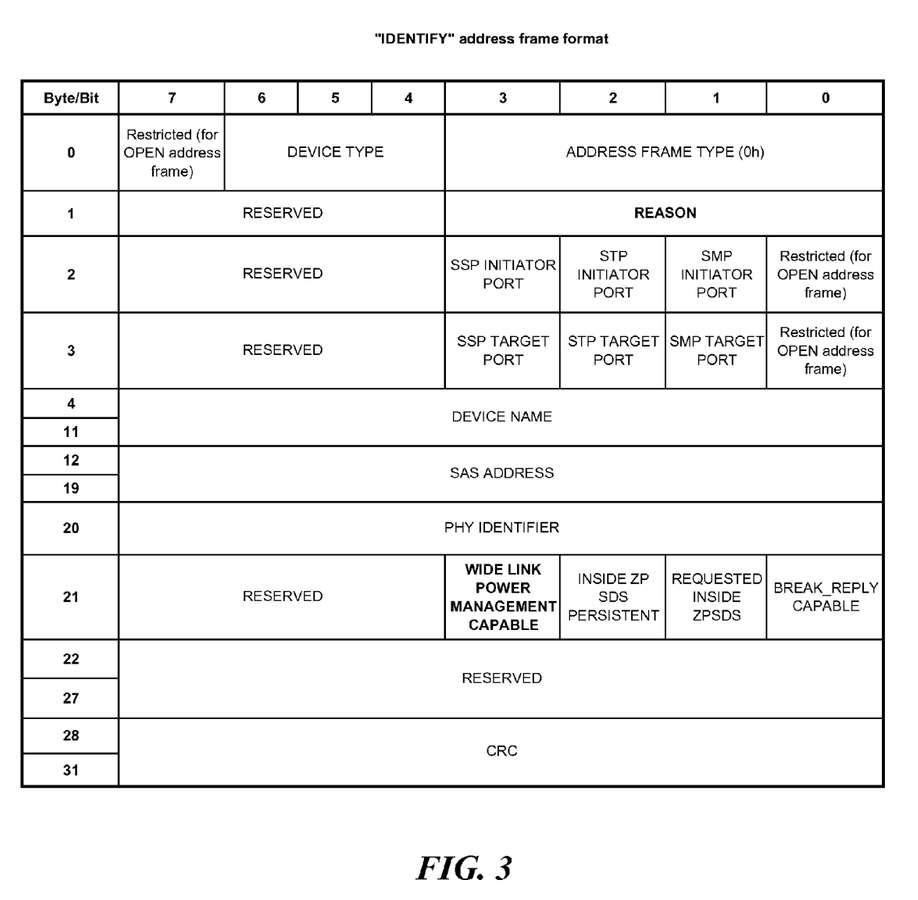
FIG. 3 illustrates a diagram of an identify address frame format including power management capability identifier field according to one aspect of the disclosure.

In one form, the threshold monitor 278 can be used to power up one or more link interfaces without having to reset the expander module 212. For example, the threshold monitor 278 can monitor bandwidth requirements of the expander module 212. Additionally, an operating condition for each link interface or communication interface can be maintained indicating an operating state (e.g., active, inactive, powered down, powered up). In one form, the expander module 212 can employ a state machine that includes an operating state of each link interface or communication modules. Upon determining if a link is in a powered down or low power operating state, the expander module 212 can initiate powering up a specific link interface or PHY to satisfy an increase in bandwidth requirements. Each link interface can be addressable and controlled using a SAS communication protocol and commands having one or more fields operable to alter an operating state of a link interface FIG. 3 illustrates a diagram of a power management capability identifier field provided within an "IDENTIFY" address frame format according to one aspect of the disclosure. The "IDENTIFY" address frame format includes up to thirty-two bytes (e.g. 0-31) with eight fields or bits of data. In one form, the "IDENTIFY" address frame includes a SAS protocol IDENTIFY Address frame. Other types of address frames can also be used. According to one aspect, the "IDENTIFY" address frame format include a "WIDE LINK POWER MANAGEMENT CAPABLE" field that can be set or cleared to identify whether a communication link, communication interface, device, communication module, PHY, etc. is power management capable. For example, a "WIDE LINK POWER MANAGEMENT CAPABLE" field can be set to one to indicate that a communication link can be activated and deactivated in response to threshold levels and bandwidth requirements demands. As such, portions or the entire communication link can be deactivated during periods of low bandwidth thereby reducing power consumption of the communication link.

Figure 4:
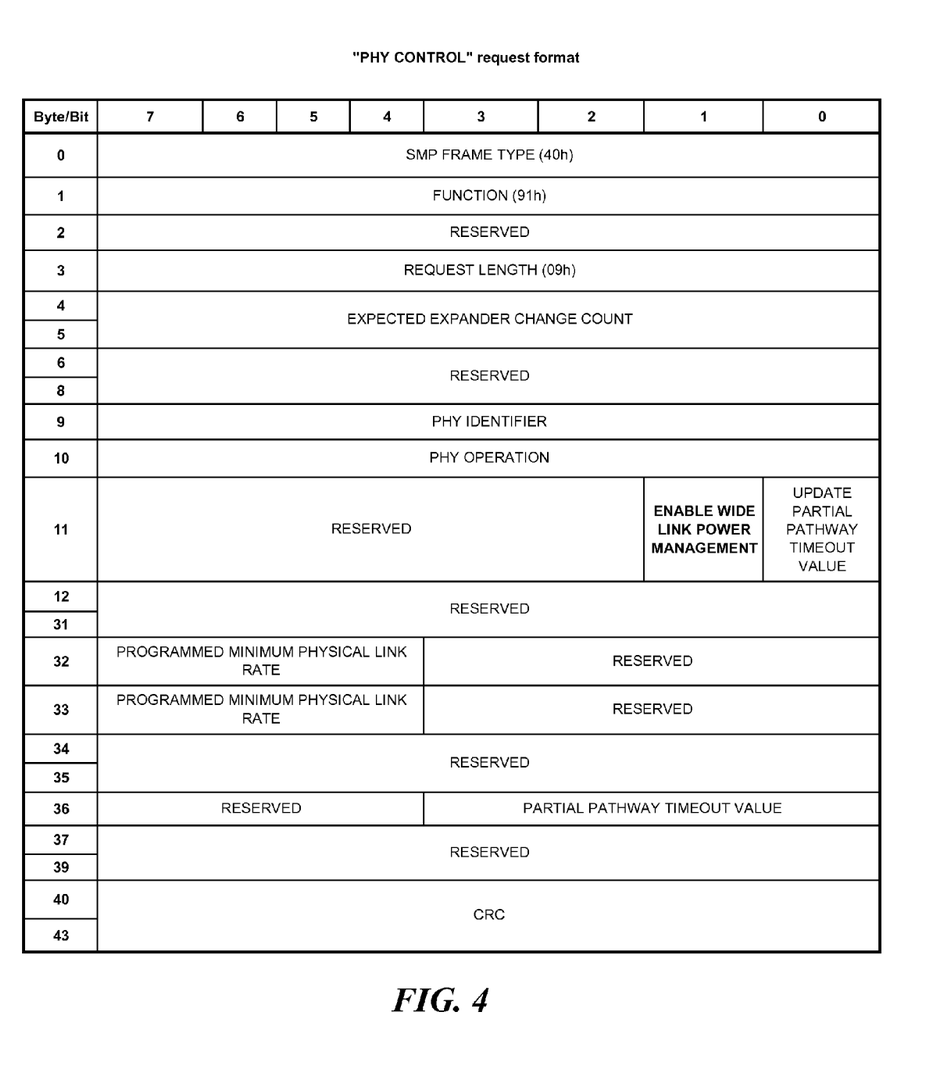
FIG. 4 illustrates a diagram of a PHY control request format including power management enablement field according to one aspect of the disclosure.

FIG. 4 illustrates a diagram of a power management enablement field provided within a "PHY CONTROL" request format according to one aspect of the disclosure. The "PHY CONTROL" request format can include a SAS protocol enabled "PHY CONTROL" request format that includes an "ENABLE WIDE LINK POWER MANAGEMENT" field. The "ENABLE WIDE LINK POWER MANAGEMENT" field can be used to enable or disable a power management capability on a PHY, or communication link, provided in association with a communication interface operable to communicate data using multiple communication links. The "ENABLE WIDE LINK POWER MANAGEMENT" field can be altered based on system policies defining power management. For example, "ENABLE WIDE LINK POWER MANAGEMENT" field can allow for an attached or active PHY to be enabled or disabled by a remote process or monitor operable to monitor or manage bandwidth and threshold levels within a communication system.

FIG. 5 illustrates a flow diagram of a method of monitoring link utilization within a communication module according to one aspect of the disclosure. The method of FIG. 5 can be employed in whole, or in part, by the information handling system 100 depicted in FIG. 1, the system 200 illustrated in FIG. 2, or any other type of system, controller, device, module, processor, or any combination thereof, operable to employ all, or portions of, the method of FIG. 5. Additionally, the method can be embodied in various types of encoded logic including software, firmware, hardware, or other forms of digital storage mediums, computer readable mediums, or logic, or any combination thereof, operable to provide all, or portions, of the method of FIG. 5.

The method begins generally at decision block 500, and determines if power management has been enabled. In one form, one or more communication channel, communication link, PHY, etc. operably coupled to a communication interface of a communication module can be power management enabled. According to one embodiment, the communication module can include an expansion module that can be placed in a power management operating mode, and can include one or more communication interfaces operable to employ a plurality of communication links or PHYs that can be employed in a power management operating mode.

For example, a power management process of a communication interface can be activated and one or more of a plurality of communication channels or PHYs can be used in a power management operating mode that can be controlled by a communication module. If at decision block 500, power management has not been enabled, the method can proceed to block 502 and the communication interface can be used in a non-power management operating mode.

If at decision block 500, power management has been enabled, the method can proceed to block 504, and link utilization for each active channel within the communication interface can be obtained. For example, individual link utilization information can be obtained for each active PHY coupled to the communication interface. In one form, the individual link utilization information can be tracked or monitored by the communication module associated with each active PHY. In other embodiments, individual link utilization information can be obtained from a remote process, sequence, application, system, processor, located remote from the plurality of PHYs. In one form, link utilization information can be obtained for an individual link, a group of links, links provided within a specific link interface, links provided within a communication module, or any combination thereof. The link utilization information can include a ratio of idle data being transfer relative to non-idle data. For example, idle data can include random valid data characters sent when a PHY or link is not in use (i.e., no active connection exists on the link). The idle data can be used to keep the link in synchronization. In other forms, SYNC primitives can also be used to maintain synchronization of the link. In one form, a link can be configured as a full duplex link and link utilization can include the higher indicator of transmitting data versus receiving data.

Upon obtaining link utilization information, the method can then proceed to block 506 and determine a total utilization of the communication interface for each active channel coupled to the communication interface. For example, a total percentage of link utilization across all active channels coupled the communication interface can be calculated as a percent of total utilization. In one form, a percent total utilization can be determined by summing a percent of link utilization of each active channel or link coupled to the communication interface, divided by the number of active channels or channels coupled to the communication interface. Other method of determining a percent of total utilization can also be used.

Upon determining the total utilization, the method proceeds to decision block 508 and compares the percent of total utilization to a utilization threshold value to determine if a channel coupled to the communication interface should be powered up and used. For example, if the percent of total utilization for the communication interface is greater than a utilization threshold value (e.g. % utilization>92% or some other desired value), the method can proceed to decision block 510 and determines if any channels coupled to the communication interface are in a power management operating mode (e.g. a "WIDE LINK POWER MANAGEMENT CAPABLE" bit is set to one and an "ENABLE WIDE LINK POWER MANAGEMENT" bit is set to one for a channel). For example, a communication interface can include multiple channels with a portion, none, or all of the channels being placed in a power management mode. If one or more of the channels are in a power management operating mode (e.g. a reduced power operating mode), the method can proceed to block 512 and a power up process can be initiated for one or more channels coupled to the communication interface. For example, a power up process, such as the power up process described in FIG. 6 below, can be employed. Other power up processes can also be employed. If at decision block 510, there are no available channels in a power management operating mode (e.g. all channels are active), the method can proceed to block 514 and waits a predetermined time (e.g. 10 seconds, 20 seconds, etc.). The method can then proceed to block 504 and repeats.

If at decision block 508, the percentage of total utilization is not greater than the threshold value, the method can proceed to block 516 and determine a second percentage of total utilization if one active channel is placed in a reduced operating mode (e.g., reduced power operating mode). For example, a second percentage of total utilization can be determined by first summing the percentage of link utilization of each active channel being used by the communication interface. Additionally, the number of active channels coupled to the communication interface, less one active channel, can then be determined (e.g., n−1). The second total percentage of utilization can be calculated by taking the difference between the sum of the total percentage of utilization and the number of active channels less one active channel. Other methods or processes to can also be used to determine a second percentage of utilization when an active channel coupled to a communication interface is placed in a reduced operating mode (e.g., in a reduced power state).

The method can then proceed to decision block 518 and determine if the second percentage of total utilization is less than a second utilization threshold (e.g. less than 85% or some other desired value). If the percentage is not less than a second threshold value, the method can proceed to block 524 and wait a period of time (e.g. 10 seconds, 20 seconds, etc or some other desired time). The method can then proceed to block 504 and repeats.

If at decision block 518, the second total percentage of utilization is less than the second utilization threshold level value, the method can proceed to decision block 520 and determines if two or more active channels are coupled to the communication interface. In one form, a specific number of active channels may be desired to ensure fail over, redundancy, or other desired configurations are met.

At decision block 520, if two or more active channels are connected to the communication interface, the method can proceed to block 522 and initiate power down process for an active channel. According to one aspect, a power down process as described in FIG. 7 below can be employed to power down an active channel. Other power down processes can also be employed. Upon initiating a power down process, the method can proceed to block 524 and repeat. If at decision block 520, two or more active channels (or some other number of active channels) are not available, the method can proceed to block 524 and repeats.

FIG. 6 illustrates a flow diagram of a method of disabling a communication channel using a threshold level according to one aspect of the disclosure. The method of FIG. 6 can be employed in whole, or in part, by the information handling system 100 depicted in FIG. 1, the system 200 illustrated in FIG. 2, or any other type of system, controller, device, module, processor, or any combination thereof, operable to employ all, or portions of, the method of FIG. 6. Additionally, the method can be embodied in various types of encoded logic including software, firmware, hardware, or other forms of digital storage mediums, computer readable mediums, or logic, or any combination thereof, operable to provide all, or portions, of the method of FIG. 6.

The method begins generally at 600 when a power down process is to be initiated to power down one or more communication channel, communication link, PHY, etc. operably coupled to a communication interface of a communication module. In one form, the communication module can include an expansion module having one or more communication interfaces operable to employ a plurality of communication channels, links, PHYs, etc.

Upon initiating a power down process, the method proceeds to decision block 602 and determines if a channel is active. For example, in a SAS enabled system the method can determine if one or more SAS connections are actively using the channels/link. If the channel is active (e.g. not available to be powered down currently), the method can proceed to block 602 and repeat as desired.

If at decision block 602, an active channel is not detected, the method can proceed to decision block 604 and determine if an inactive channel has a power management request pending received from the other endpoint. For example, a SAS enabled communication channel has received a SAS REQ_PM primitive If at decision block 604, the communication channel does have a power management request pending, the method can proceed to block 606 and a power management acknowledgement for a specific communication channel can be issued. For example, a SAS enabled communication channel transmits a SAS ACK_PM primitive. The method can then proceed to block 614 and proceed as described below.

If at decision block 604, a power management request has not been received or is undetected, the method can proceed to block 608 and a command to request power management can be communicated to one or more communication channels or PHYs to request that the communication channel go into a power management operating mode. For example, a SAS enabled communication interface can issue a SAS REQ_PM primitive on the communication channel that is requested to be placed in a power management operating mode. The method can then proceed to block 610 and wait for a power management response signal to be returned from one or more of the of the active communication channels. Upon receiving a power management response, the method can then proceed to decision block 612. If at decision block 612, the power management response does not include a power management acknowledgement (e.g., NAK_PM for a SAS enabled system), the method can proceed to decision block 602 and repeat as desired.

If at decision block 612, a power management acknowledgement value is received (e.g., a ACK_PM for a SAS enabled communication interface), the method can proceed to block 614 and wait for a time period, such as one (1) millisecond, five (5) milliseconds, or some other period of time, sufficient to allow pending communications to complete prior to powering down an communication channel. The method can then proceed to block 616 and a transmitter associated with the communication channel or PHY can be disabled. For example, a PHY can include a transmitter circuit operable to communicate signals. As such, the transmitter can be deactivated or disabled thereby reducing power consumption of the communication channel. Other portions of the PHY or communication channel can also be placed in a reduced power state. Upon disabling the transmitter, the method can proceed to block 618 and end. In this manner, at least one communication channel provided in association with a communication interface of a communication module can be placed in a reduced operating state during low bandwidth periods. As such, a reduction of power consumption of a communication interface and communication module can be realized without having to power down or reduce the operating state of the communication module or communication interface. Additionally, during use of a SAS communication environment, through providing a communication channel in a power management operating mode that is agreed to by both ends of a communication channel (i.e., the power management request and response), a SAS BROADCAST(CHANGE) primitive is not generated.

FIG. 7 illustrates a flow diagram of a method of enabling a communication channel according to one aspect of the disclosure. The method of FIG. 7 can be employed in whole, or in part, by the information handling system 100 depicted in FIG. 1, the system 200 illustrated in FIG. 2, or any other type of system, controller, device, module, processor, or any combination thereof, operable to employ all, or portions of, the method of FIG. 7. Additionally, the method can be embodied in various types of encoded logic including software, firmware, hardware, or other forms of digital storage mediums, computer readable mediums, or logic, or any combination thereof, operable to provide all, or portions, of the method of FIG. 7.

The method begins generally at 700 when a power up process is to be initiated to power up one or more communication channel, communication link, PHY, etc. operably coupled to a communication interface of a communication module. In one form, the communication module can include an expansion module having one or more communication interfaces operable to employ a plurality of communication channels, links, PHYs. etc.

At block 704, a channel alignment can be initiated between two link interfaces to establish a communication channel. For example, a link interface can include a first PHY of a first communication interface that can be coupled to a second PHY of a second communication interface. Each PHY can include transmitter and receiver circuits operable to communicate signals between each PHY. During initialization, each PHY can send an alignment signal to establish signal timing, protocol, synchronization, etc. between each PHY.

Upon initiating a channel alignment, the method can proceed to block 706 and determines if the communication channel is aligned. If the communication channel is not aligned, the method can proceed to decision block 708 and determines if an alignment period has elapsed. For example, an alignment period of twenty (20) milliseconds may be established to allow for a channel to align. If the channel does not align within the alignment period, the method can proceed to block 716 and the communication channel can be reset using the normal link initialization protocol defined by the communication interface. For example, a communication interface, communication module, PHY, or any combination thereof, can be reset or reinitialized. In one form, a SAS link reset sequence will occur and as such a "BROADCAST (CHANGE)" primitive can be issued to indicate a change in the SAS domain. In this manner, each communication channel or PHY within the communication interface or communication module can be re-activated in support of restoring the communication channel in event of problems returning from a power management operating mode.

If at decision block 708, the channel aligns, the method can proceed to block 710 and an "IDENTIFY" address frame is transmitted and received. For example, an IDENTIFY address frame illustrated in FIG. 3 can include a "WIDE LINK POWER MANGEMENT CAPABLE" field set and the reason field of the IDENTIY address frame is set to "PM WAKEUP". If the reason field is not set to "PM WAKEUP" indicating that the communication channel did not realign because of power management power up process, the method can proceed to block 716 and proceed as described above. If at decision block 712, the reason field is set to "PM WAKEUP" or some other value to indicate a power management wakeup or to indicate an activate channel, the method can proceed to block 714 and communicates a notice of channel availability. For example, a notice of availability can be communicated to a communication module, communication interface, expander module, device, etc. that can be operable to an additional communication channel. In one form, the communication channel provided in association with a communication interface of an expander module can communicate a status to a logic of the expander module. As such, the expander module can use the active channel to satisfy any bandwidth requirements of the expander module or communication interface as desired. In one form, a management application associated with the communication interface or communication interface can be updated to indicate that a communication channel or PHY is available.

In one embodiment, the method of FIG. 7 can be modified to send alignment primitives to power up transmission lines between communication interfaces, links, PHYs and the like, to establish a communication channel. The method can include providing SAS-enabled primitives that can include ALIGN (1) primitives that may be repeatedly sent/received between PHYs. Additionally, an ALIGN (2) primitive can be sent/received in response to the ALIGN(1) primitive between the PHYs to establish a communication channel. Various other alignment sequences can also be used as desired.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of operating a communication module, the method comprising:
   obtaining a first link utilization of a first communication channel coupled to a first communication interface;
   enabling power management of the first communication interface;
   determining in a processor a first utilization total of the first communication interface;
   determining a percentage of total utilization of the communication interface;
   determining a number of active communication channels of the communication interface;
   determining a quotient between the percentage of total utilization and the number of active communication channels;
   comparing the quotient to a utilization threshold level; and
   modifying operation of the first communication channel using the first utilization total in response to comparing the quotient to the utilization threshold level.

2. The method of claim 1, further comprising:
   monitoring use of a plurality of communication channels coupled to the first communication interface;
   detecting at least one communication channel of the plurality communication channels is in a power management operating mode; and
   modifying operation of the at least one communication channel in response to comparing the utilization total to a utilization threshold level.

3. The method of claim 2, further comprising:
   determining a second utilization total;
   comparing the second utilization total to the utilization threshold level; and
   initiating a power down sequence in response to the second utilization total being less than the utilization threshold level.

4. The method of claim 3, further comprising:
   determining the second utilization total based on using at least one less communication channel of the plurality communication channels;
   communicating a power down request of the at least one less communication channel if the second utilization total is less than the utilization threshold level;
   receiving an acknowledgement of a power down operating mode of the at least on less communication channel; and
   utilizing a remaining communication channel of the plurality of communication channels.

5. The method of claim 4, further comprising:
   receiving the power down request; and
   disabling a transmitter of at least one of the plurality of communication channels.

6. The method of claim 4, further comprising:
   receiving a power management value within an identify address portion communicated from the communication interface; and
   communicating a control request including the power down request to the communication interface.

7. The method of claim 2, further comprising:
   determining the utilization total is greater than the utilization threshold level;
   detecting at least one communication channel in a power management operating mode; and
   issuing a control to power up the at least one communication channel.

8. The method of claim 2, further comprising:
   determining that none of the plurality of devices are in a power management mode; and
   issuing a command to the plurality of devices to activate the plurality of devices.

9. The method of claim 1, further comprising:
   issuing a serial attached small computer system interface (SAS) enabled command to the communication interface in association with powering down the communication channel; and
   receiving a SAS enabled response from the communication interface in response to the powering down of the communication channel.

10. The method of claim 1, further comprising:
    detecting a link is inactive;
    determining a reason code associated with the inactive link;
    initiating power management request;
    receiving the power management request; and
    enabling power management of the first communication interface.

11. A communication module comprising:
    a communication interface operable to receive link utilization information of a plurality of communication channels of the communication interface; and
    a processor operable to determine a percent utilization of the plurality of communication channels using the link utilization information, the processor operable to initiate issuing a power management request of at least one of the plurality of communication channels in response to comparing the percentage of link utilization to a threshold level.

12. The communication module of claim 11, further comprising:
    a plurality of communication interfaces including a plurality of communication channels; and wherein at least one of the plurality of communication interfaces is operable to alter operation of at least one communication link using a power management operating parameter.

13. The communication module of claim 12, further comprising
a threshold monitor operably associated with the communication interface, the threshold monitor operable to determine the percentage of link utilization; and
a state machine including a operating status of each of the plurality of communication channels of the communication interface, the state machine operable to be updated in response to altering operation of a transmitter associated with at least one of the communication channels.

14. The communication module of claim 11, further comprising a serial attached small computer system interface (SAS) enabled expander module.

15. The communication module of claim 11, further comprising:
a monitor operable to determine a total utilization of the plurality of communication channels of the communication interface; and
wherein the monitor is further operable to compare the total utilization to a threshold level, the monitor operable to initiate:
deactivating a number of communication channels in response to the total utilization being less than the threshold value; and
activating a number of deactivated communication channels in response to the total utilization being greater than the threshold value.

16. The communication module of claim 11, further comprising an information handling system operable to enable a power management operating mode of the communication interface.

17. An information handling system comprising:
a first communication interface operably coupled to a processor operable to initiate power management of the communication interface;
a plurality of communication interfaces coupled to the first communication interface, the plurality of communication interfaces responsive to a power management request communicated by the first communication interface; and
a threshold monitor that initiates altering use of at least one of a plurality of communication channels in response to determining a percent utilization relative to a threshold level of at least one of the plurality of communication interfaces.

18. The information handling system of claim 17, wherein the communication interface includes a serial attached small computer system interface (SAS) enabled communication interface.

19. The information handling system of claim 18, further comprising the communication interface that enables and disables at least one transmitter of the plurality of communication channels.

* * * * *